(12) United States Patent
Huber et al.

(10) Patent No.: US 9,427,784 B2
(45) Date of Patent: Aug. 30, 2016

(54) DEVICE AND METHOD FOR DRAINING AND RINSING CONTAINERS FILLED WITH FLUID

(75) Inventors: Robert Huber, Limburgerhof (DE); Heinz-Gerd Wegkamp, Buerstadt (DE)

(73) Assignee: BASF SE, Ludwigshafen (DE)

(*) Notice: Subject to any disclaimer, the term of this patent is extended or adjusted under 35 U.S.C. 154(b) by 205 days.

(21) Appl. No.: 14/117,719

(22) PCT Filed: May 16, 2012

(86) PCT No.: PCT/EP2012/059084
§ 371 (c)(1),
(2), (4) Date: Nov. 14, 2013

(87) PCT Pub. No.: WO2012/156433
PCT Pub. Date: Nov. 22, 2012

(65) Prior Publication Data
US 2014/0174484 A1 Jun. 26, 2014

(30) Foreign Application Priority Data
May 18, 2011 (EP) .................................... 11166553

(51) Int. Cl.
| | | |
|---|---|---|
| *B08B 7/00* | (2006.01) | |
| *B08B 5/04* | (2006.01) | |
| *B08B 1/02* | (2006.01) | |
| *B08B 9/04* | (2006.01) | |
| *B08B 3/00* | (2006.01) | |
| *B08B 3/04* | (2006.01) | |

(Continued)

(52) U.S. Cl.
CPC . *B08B 9/30* (2013.01); *B08B 9/08* (2013.01); *B09B 3/0058* (2013.01); *B65B 69/00* (2013.01); *B08B 9/0821* (2013.01)

(Continued)

(58) Field of Classification Search
None
See application file for complete search history.

(56) References Cited

U.S. PATENT DOCUMENTS 3,885,739 A  5/1975  Tuttle
4,759,504 A  7/1988  Woodward
(Continued)

FOREIGN PATENT DOCUMENTS

CA  2845485  3/2013
DE  2959835  3/1978
(Continued)

OTHER PUBLICATIONS

International Search Report, issued in PCT/EP2012/059084, dated Jul. 11, 2012.
(Continued)

*Primary Examiner* — Eric Golightly
*Assistant Examiner* — Arlyn I Rivera-Cordero
(74) *Attorney, Agent, or Firm* — Brinks Gilson & Lione

(57) ABSTRACT

The invention relates to a device for draining and rinsing containers filled with fluid, comprising an accommodating unit for accommodating the container and comprising a removal unit, which has a removal line, a coupling connected to the removal line for connecting the a removal opening of the container, and a pumping apparatus by means of which the fluid in the container can be pumped out of the container, and comprising a rinsing unit, which has a rinsing pin, a rinsing line connected to the rinsing pin, and a control apparatus, wherein the rinsing pin can be moved by means of the control apparatus in such a way that the rinsing pin automatically pierces a wall of the container and rinses out the container after the container has been drained.

17 Claims, 2 Drawing Sheets

(51) Int. Cl.
  *B08B 9/30* (2006.01)
  *B09B 3/00* (2006.01)
  *B65B 69/00* (2006.01)
  *B08B 9/08* (2006.01)

(56) References Cited

U.S. PATENT DOCUMENTS

| | | | |
|---|---|---|---|
| 4,790,454 | A | 12/1988 | Clark et al. |
| 4,821,927 | A | 4/1989 | Paulsen et al. |
| 5,441,180 | A | 8/1995 | Woodruff |
| 5,626,042 | A | 5/1997 | Vasseur |
| 5,816,453 | A | 10/1998 | Spencer et al. |
| 5,941,463 | A | 8/1999 | Herstek et al. |
| 6,070,762 | A | 6/2000 | Klann |
| 6,431,465 | B1 | 8/2002 | Yie |
| 6,644,282 | B2 | 11/2003 | Schwarz |
| 8,607,824 | B2 | 12/2013 | Brummitt |
| 2004/0035949 | A1 | 2/2004 | Elkins et al. |
| 2004/0089234 | A1 | 5/2004 | Hagglund et al. |
| 2005/0188958 | A1 | 9/2005 | Klenk et al. |
| 2009/0101219 | A1* | 4/2009 | Martini et al. ........... 137/565.29 |
| 2010/0072301 | A1 | 3/2010 | Cater |
| 2010/0175764 | A1 | 7/2010 | Cecchin et al. |
| 2011/0203162 | A1 | 8/2011 | Cink et al. |
| 2011/0203500 | A1 | 8/2011 | des Garennes et al. |
| 2012/0017874 | A1 | 1/2012 | Yildirim et al. |
| 2013/0153684 | A1 | 6/2013 | Taranta et al. |
| 2013/0273192 | A1* | 10/2013 | Van Gerwen ................. 425/317 |

FOREIGN PATENT DOCUMENTS

| | | |
|---|---|---|
| DE | 4119659 | 12/1992 |
| DE | 19616537 | 9/1997 |
| DE | 19612524 | 10/1997 |
| DE | 20014354 | 1/2001 |
| EP | 0 424 571 | 5/1991 |
| EP | 0462749 | 6/1991 |
| EP | 0803670 | 10/1997 |
| EP | 1136135 | 5/2005 |
| EP | 2165770 | 3/2010 |
| FR | 2 739 253 | 4/1997 |
| WO | WO 2012/025581 | 3/2012 |
| WO | WO 2013/030071 | 3/2013 |

OTHER PUBLICATIONS

International Preliminary Report on Patentability, issued in PCT/EP2012/059084, dated Nov. 28, 2013.

Mollett et al., "Formulation Technology", Wiley-VCH 2001, pp. 389-397.

Office Action dated Oct. 3, 2014 for corresponding U.S. Appl. No. 13/818,244, filed Feb. 21, 2013.

* cited by examiner

DEVICE AND METHOD FOR DRAINING AND RINSING CONTAINERS FILLED WITH FLUID

CROSS-REFERENCE TO RELATED APPLICATIONS

This application is a national stage of PCT/EP2012/059084, filed May 16, 2012. This application also claims priority under 35 U.S.C. §119 to European Patent Application No. 11166553.5, filed May 18, 2011

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to an apparatus and a method for draining and rinsing containers filled with fluid. Furthermore, the invention relates to the use of the apparatus according to the invention for draining and rinsing containers filled with crop protection agents.

2. Description of the Related Art

Not applicable

BRIEF SUMMARY OF THE INVENTION

In order to drain containers which are filled, for example, with a crop protection agent, a spray apparatus is connected to the removal opening of the container. The crop protection agent located in the container is then conveyed out by means of the spray apparatus and sprayed as desired. After the container has been emptied, said container, depending on the crop protection agent with which it was filled, has to be rinsed before it can be disposed of or reused. In order to rinse the container, a rinsing liquid, for example water, can be let in and let out again through the removal opening. Furthermore, there are rinsing guns with a sharp spike with which a wall of the container can be manually pierced, whereupon the container can be rinsed out by means of the spray gun. However, a disadvantage of using such rinsing guns is that manual rinsing is complicated for the user. In addition, there is a risk of the user being injured while piercing the wall of the container.

The present invention is therefore based on the object of providing an apparatus and a method with which a container filled with fluid can be drained and rinsed with little expense.

This object is achieved according to the invention by an apparatus with the features of claim 1 and a method with the features of claim 10. Advantageous refinements and developments emerge from the dependent claims.

The apparatus according to the invention for draining and rinsing containers filled with fluid comprises a receiving unit for receiving the container and a removal unit which comprises a removal line, a coupling which is connected to the removal line and is intended for connection to a removal opening of the container, and a conveying device with which the fluid located in the container is conveyable out of the container. Furthermore, the apparatus according to the invention comprises a rinsing unit which comprises a rinsing spike, a rinsing line connected to the rinsing spike, and a control device. The rinsing spike is movable by means of the control device in such a manner that said rinsing spike, after the draining of the container, automatically pierces a wall of the container and rinses out the container.

An advantage of the apparatus according to the invention is that a manual rinsing operation is not required. The container, after being drained, is automatically rinsed out, for example with a rinsing liquid which passes through at least one outlet opening of the rinsing spike into the interior of the container. This makes it easier for the user to use the container. In addition, there is no risk of injury to the user while piercing the wall of the container. Furthermore, because of the removal unit of the apparatus according to the invention, there is advantageously no risk of the user coming into contact with the fluid located in the container. Such contact should be avoided, for example, if crop protection agents are located in the container. In addition, the risk of spilling the fluid located in the container, i.e. in particular of crop protection agents, is reduced by the apparatus according to the invention.

According to a development of the apparatus according to the invention, the receiving unit comprises a rotation device by means of which the container, after insertion into the receiving unit, is rotatable by a predetermined angle. The container is rotatable, for example, about an axis which is not oriented parallel to the vertical, i.e. which is oblique with respect to the vertical. The container can be rotatable, for example, about an axis which is oriented within a range of +/−20° about the horizontal. The axis is preferably oriented horizontally such that the container is rotatable about a horizontal axis. The container can be rotated, for example, by 180° about a horizontal axis. Rotation of the container makes handling and removal of the fluid easier, in particular if the removal opening points downward after the rotation. The container can thereby be emptied as comprehensively as possible.

According to a further refinement of the apparatus according to the invention, the rinsing unit comprises a lifting apparatus which is coupled to the rinsing spike and to the control device. In this case, upon a signal of the control device, the rinsing spike can be moved by means of the lifting apparatus in such a manner that said rinsing spike pierces a wall of the container.

According to a refinement of the apparatus according to the invention, said apparatus can have a first detecting device for detecting the quantity of the fluid located in the container, and a second detecting device for detecting the quantity of the fluid removed from the container. The first detecting device can comprise, for example, an electronic receiving device by means of which radio signals emitted by the received container are receivable. In this case, for example, a transmitter or a transponder transmitting data to the receiving device can be fastened to the container. Said data can contain, in particular, information about the type and the quantity of the fluid located in the container. The transponder can be, for example, an RFID (radio-frequency-identification) transponder. This transponder is arranged, in particular, at that point of the container at which the rinsing spike pierces the container, and therefore the transponder is destroyed after the rinsing operation.

In addition, by automatic detection of the type of crop protection agent contained in the container, the user can be assisted in the mixing together and discharging of the spray fluid. For example, instructions for the correct handling of the crop protection agent, for example on mixability and spacing rules, can be output via an output unit.

The second detecting device can comprise, for example, a flowmeter with which the volumetric flow rate of the fluid removed in a removal line is measured. However, the removal quantity can also be automatically determined in a different way.

In these refinements, the control device is coupled in particular by data systems technology to the receiving device and the removal unit, and therefore the data received by the control device from the receiving device can be evaluated so as to detect information regarding the quantity of the fluid located in the container. Furthermore, the control device can be coupled by data systems technology to the first and second detecting device and to the rinsing unit such that an emptying of the container is automatically detectable by means of the control device and the subsequent rinsing of the container is initiatable.

The present invention furthermore relates to the use of the above-described apparatus according to the invention for draining and rinsing containers which are filled with a crop protection agent.

The container is, in particular, containers which are made from plastics materials, i.e. the predominant part of the container, in particular the container walls, is formed by plastics materials. The container is in particular dimensionally stable, i.e. the container only slightly changes the shape thereof during filling or in the event of a mechanical load and substantially or completely maintains the original shape thereof in the drained or unloaded state. Typical dimensionally stable containers are canisters, bottles, barrels, casks and the like. The abovementioned containers generally have at least one or two openings for filling the container and/or for removing the fluid. Said openings are generally provided with customary closure means, such as screw covers, stoppers, enclosures, taps, dry couplings and the like. The removal opening is designed in such a manner that the coupling of the removal line can be connected to the latter in a fluid-tight manner. The size of the containers can vary over wide ranges and the interior volume of the containers frequently lies, depending on the type of container, within the range of 0.1 to 1000 l.

Of course, the thickness of the container walls depends on the size and the interior volume of the containers and is typically within the range of 0.1 to 10 mm and, in particular, within the range of 0.5 to 5 mm (mean value, except for regions in which openings or means for transporting the containers, such as handles, are located). In the region in which the rinsing spike pierces the container wall for rinsing purposes, the thickness of the container wall is designed depending on the container material in such a manner that the rinsing spike can pierce the container wall.

The container can in particular receive a liquid, for example aqueous active compound formulations, such as aqueous suspension concentrates (WSC), aqueous emulsions (EW), water-soluble concentrates (WL), aqueous suspoemulsions (SEC), and active compound formulations which differ therefrom and are dispersible in water or are emulsifiable, for example non-aqueous suspension concentrates (SC), emulsifiable concentrates (EC), solvent-containing, dispersible concentrates (DC), oil suspension concentrates, water-soluble concentrates (SL), water-dispersible granules (WG) and water-soluble granules (SG), water-dispersible powders (WP) and water-soluble powders (SP). The container can be designed in particular for receiving liquid formulations and, especially, liquid, aqueous formulations.

There are no restrictions on the type of active compound. The active compound formulations may be formulations of herbicides, fungicides, insecticides, acaricides, nematicides, growth regulators, bactericides and other formulations which are typically used in crop protection, including seed treatment, and in protection of materials, for example protection of wood, but also for preventive combating of parasitic organisms which infest warm-blooded animals.

In the method according to the invention for draining and rinsing containers filled with fluid, the container is received by a receiving unit, a removal opening of the container is connected to a coupling of a removal line, the fluid located in the container is conveyed out of the container, after the draining of the container, a wall of the container is automatically pierced by a rinsing spike, and the container is rinsed out with a rinsing liquid by means of a rinsing line connected to the rinsing spike. In the method according to the invention, the draining and rinsing of the container therefore take place in an automated manner.

Furthermore, in the method, the container, after insertion into the receiving unit and after connection of the removal opening of the container to the coupling of the removal line, is automatically rotated by a predetermined angle. The container is rotated in particular in such a manner that the removal opening points downward after rotation. The container is rotated, for example, about an axis which is not oriented parallel to the vertical, i.e. is oblique with respect to the vertical. The container can be rotated, for example, about an axis which is oriented within a range of +/−20° about the horizontal. The axis is preferably oriented horizontally. The container is rotated, in particular, by 180° about a horizontal axis. Furthermore, the quantity of the fluid located in the container and the quantity of the fluid removed from the container can preferably be detected. After it has been detected that the container has been emptied, the wall of the container is automatically pierced by the rinsing spike and the container is automatically rinsed out with the rinsing liquid.

BRIEF DESCRIPTION OF THE SEVERAL VIEWS OF THE DRAWINGS

The invention will now be explained using an example and with reference to the drawings.

DETAILED DESCRIPTION OF THE INVENTION

The example of the apparatus according to the invention involves an apparatus for draining and rinsing a canister 1 which is filled with a liquid crop protection agent. The canister 1 comprises a removal opening 2 and an RFID transponder 3 on which information regarding the quantity and the type of the crop protection agent contained in the canister 1 is stored.

Figure 1:
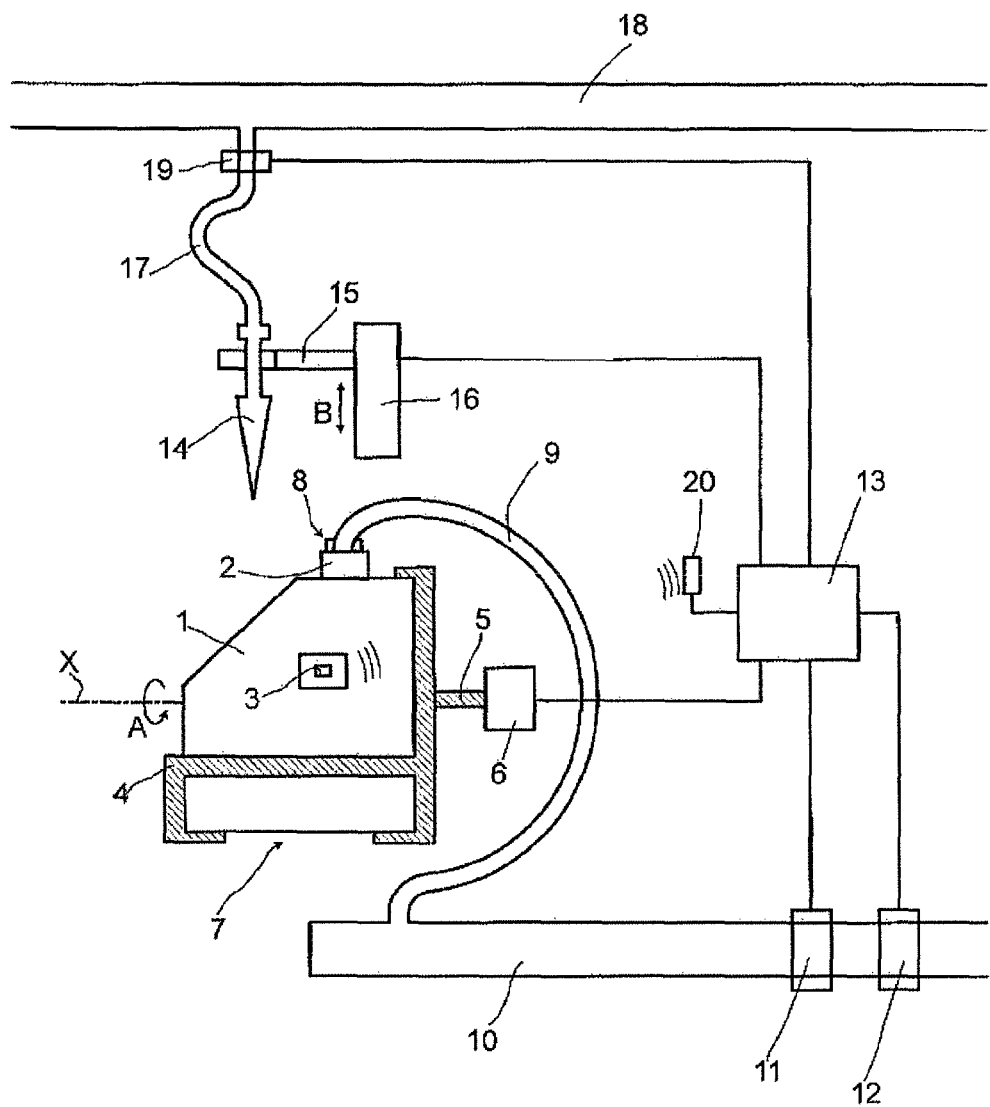
FIG. 1 shows an example of the apparatus according to the invention before the container has been rotated.

The apparatus comprises a receiving unit 4 for receiving the canister 1. As shown in FIG. 1 the canister 1 can be inserted manually into the receiving unit 4 in such a manner that said canister snaps into place and is subsequently firmly held by the receiving unit 4.

After the canister 1 has been inserted into the receiving unit 4, a coupling 8 which is provided at the end of a removal line 9 is connected to the removal opening 2 of the canister 1 in a liquid-tight manner. The connection is undertaken in such a manner that, during the removal of the crop protection agent, crop protection agent cannot escape.

The receiving unit 4 is furthermore equipped with a rotation device which comprises a shaft 5 and a motor 6. The receiving unit 4 together with the canister 1 can be rotated in the direction of the arrow A about the axis X by means of the rotation device. The axis X is oriented horizontally. However, it would also be possible for the orientation of the axis X to deviate from the vertical, i.e. to be oriented obliquely with respect to the vertical, but also to deviate from the horizontal. The orientation of the axis X can be adjusted in particular according to the positioning of the removal opening 2 in order to ensure draining of the canister 1.

Figure 2:
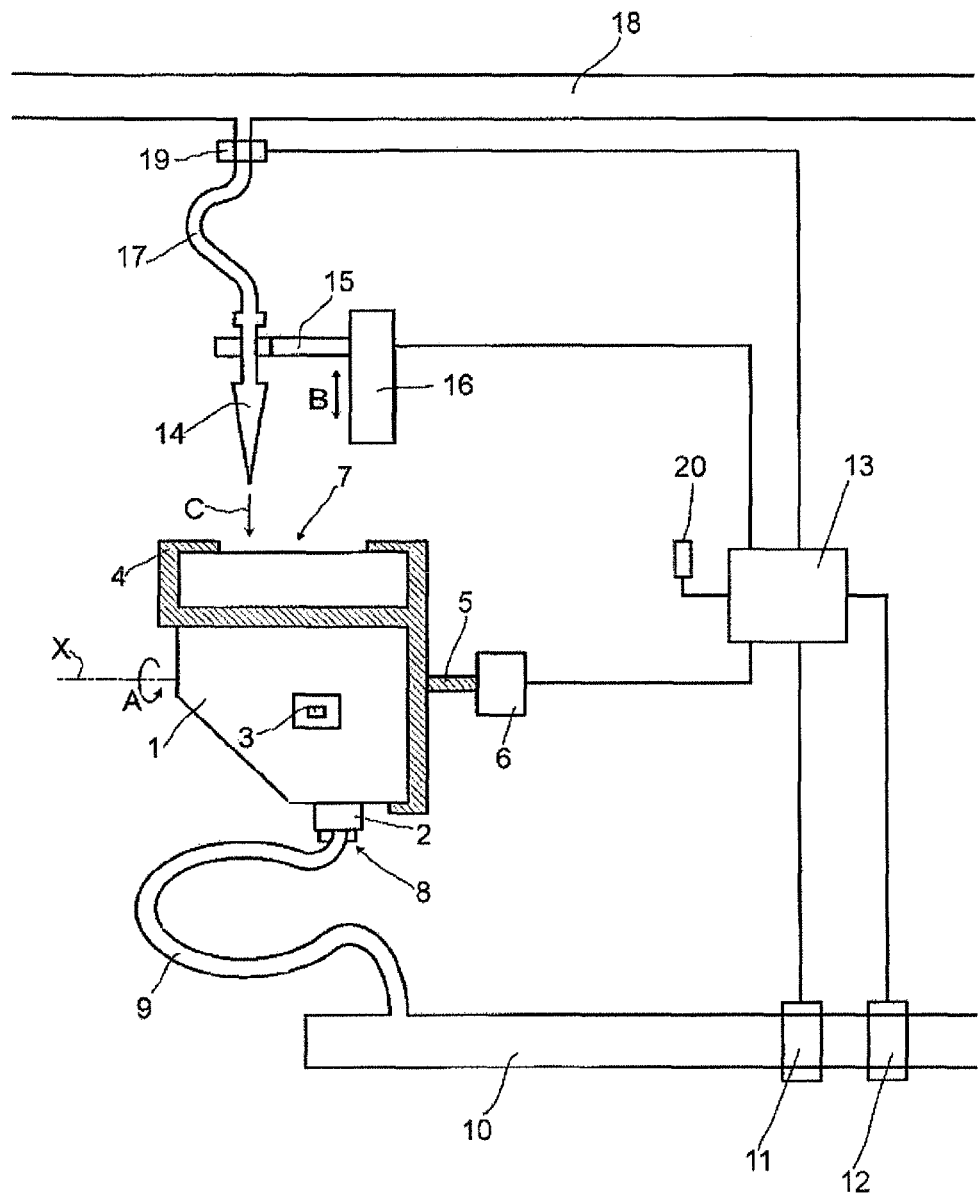
FIG. 2 shows the example of the apparatus according to the invention after the container has been rotated.

After the canister 1 has been inserted into the receiving unit 4 and connected to the coupling 8, the receiving unit 4 is rotated in such a manner that the removal opening 2 points downward, as shown in FIG. 2. This rotation can be carried out manually by the user. However, it is also possible for the rotation to be carried out automatically by means of the motor 6. For this purpose, the motor 6 is connected to a control device 13. Furthermore, a sensor (not shown) which automatically detects the receiving of the canister 1 in the receiving unit 4 and the connection to the coupling 8 and which, after the detection, transmits a corresponding signal to the control device 13 can be provided. The control device 13 can subsequently automatically carry out the rotation of the receiving unit 4.

Furthermore, the RFID transponder 3 of the canister 1 transmits information on the type and quantity of the crop protection agent contained in the container 1 to a receiving device 20 which is connected to the control device 13. The control device 13 thereby detects how much of which crop protection agent is contained in the canister 1.

The crop protection agent can subsequently be conveyed out of the canister 1 by means of a removal unit. The removal unit comprises the removal line 9 connected to the coupling 8. The removal line 9 can merge into a removal tube 10 in which a conveying device 11 and a flowmeter 12 are integrated. The conveying device 11 can be a pump or a simple valve, if the pressure produced by the gravitational force of the crop protection agent suffices for removing the crop protection agent. At the same time, controlled ventilation of the canister 1 takes place via said valve. The conveying device 11 is controlled by the control device 13 in such a manner that the desired quantity of the liquid crop protection agent is removed from the canister 1. The flowmeter 12 here transmits the removed quantity to the control device 13. However, the removed quantity can also be determined in a different manner and conveyed to the control device. By means of a comparison of the original quantity of crop protection agent contained in the canister 1 and the removed quantity, the control device 13 detects the residual quantity located in each case in the canister 1. The control device 13 can thereby also detect when the canister 1 has been completely emptied.

After the canister 1 has been emptied, the control device 13 automatically initiates the rinsing of the canister 1. A rinsing unit which comprises a rinsing spike 14, a rinsing line 17 connected to the rinsing spike 14, and a lifting apparatus 16 is provided for rinsing the canister 1. The rinsing spike 14 is connected to the lifting device 16 mechanically via a rod 15. The lifting device 16 can move the rod 15 to and fro in the direction of the arrow B.

After the control device 13 has detected that the canister 1 has been completely emptied and the latter should be rinsed, the control device 13 transmits a corresponding signal to the lifting apparatus 16. The latter then moves the rinsing spike 14 in the direction of the arrow C (see FIG. 2) such that the rinsing spike 14 pierces the bottom wall 7 of the canister 1. The control device 13 then opens a valve 19 provided in the rinsing line 17, and therefore a pressurized rinsing liquid located in the tube 18 enters the canister 1 through the rinsing line 17 and through at least one opening formed in the rinsing spike 14 and rises said canister out. The rinsing liquid can be let out via the opening 2 or another opening (not shown) of the canister 1. The canister 1, after it has been emptied, can thereby be automatically rinsed out.

In addition, the RFID transponder 3 of the canister 1 can be destroyed. For this purpose, said RFID transponder can be arranged precisely at that point of the canister 1 at which the rinsing spike 14 pierces the canister 1. By this means, the canister 1 is unusable after the rinsing operation.

After the rinsing, suitable measures can also be taken for drying the canister.

When the rinsing operation has ended, the rinsing spike 14 can automatically be pulled again out of the bottom wall 7 of the canister 1 by means of the lifting apparatus 16. The control device 13 then rotates the receiving unit 4 by 180° again, and therefore the opening 2 points upward, as shown in FIG. 1. The user can then release the coupling 8 and remove and dispose of the canister 1.

So that rinsing liquid which possibly drips through the opening formed by the rinsing spike 14 is caught, a drip trough can also be provided in the receiving unit 4.

If a valve which automatically closes when the coupling 8 is released is provided in the receiving opening 2 of the canister 1, the user can also remove the canister 1 in the position shown in FIG. 2 for disposal. This has the advantage that rinsing liquid cannot drip out through the opening, which has been produced in the bottom wall 7 by the rinsing spike 14, when the canister 1 is removed.

By means of the apparatus according to the invention, canisters for crop protection agents and the contents of said canisters can therefore be automatically identified, and the canister 1 can be emptied and subsequently rinsed.

LIST OF REFERENCE NUMBERS

1 Container, canister
2 Removal opening
3 Transponder
4 Receiving unit
5 Shaft
6 Motor
7 Bottom wall of the canister 1
8 Coupling
9 Removal line
10 Removal tube
11 Conveying device
12 Flowmeter
13 Control device
14 Removal spike
15 Rod
16 Lifting apparatus
17 Rinsing line
18 Tube 19 Valve
20 Receiving device

The invention claimed is:

1. A method for draining and rinsing containers filled with fluid, in which
the container is received by a receiving unit;
a removal opening of the container is connected to a coupling of a removal line;
the fluid located in the container is conveyed out of the container;
after the draining of the container, a wall of the container is automatically pierced by a rinsing spike; and
the container is rinsed out with a rinsing liquid by means of a rinsing line connected to the rinsing spike, wherein the container is rotated about an axis which is not oriented parallel to a vertical axis.

2. The method of claim 1, wherein the container, after insertion into the receiving unit is automatically rotated by a predetermined angle.

3. The method of claim 1, wherein the container is rotated about a horizontal axis.

4. The method of claim 1, wherein the container is rotated in such a manner that the removal opening points downward after the rotation.

5. The method of claim 1, wherein the quantity of the fluid located in the container and the quantity of the fluid removed from the container are detected and, after it has been detected that the container has been emptied, the wall of the container is automatically pierced by the rinsing spike and the container is automatically rinsed out with the rinsing liquid.

6. The method of claim 1, wherein the container is rotatable about a horizontal axis.

7. The method of claim 1, wherein the receiving unit comprises a rotation device by means of which the container, after insertion into the receiving unit, is rotatable by a predetermined angle.

8. The method of claim 7, wherein the container is rotatable by means of the rotation device about an axis which is not oriented parallel to the vertical.

9. The method of claim 1, wherein the rinsing unit comprises a lifting apparatus which is coupled to the rinsing spike and to a control device such that, upon a signal of the control device, the rinsing spike is movable by means of the lifting apparatus in such a manner that said rinsing spike pierces the wall of the container.

10. The method of claim 9, wherein the apparatus has a first detecting device for detecting the quantity of the fluid located in the container, and a second detecting device for detecting the quantity of the fluid removed from the container.

11. The method of claim 9, wherein the control device is coupled by data systems technology to the first and second detecting device and to the rinsing unit, wherein an emptying of the container is automatically detectable by means of the control device and the subsequent rinsing of the container is initiatable.

12. An apparatus for draining and rinsing containers filled with fluid, comprising:
a receiving unit for receiving the container; and
a removal unit which comprises a removal line, a coupling which is connected to the removal line and is intended for connection to a removal opening of the container, and a conveying device with which the fluid located in the container is conveyable out of the container,
which comprises:
a rinsing unit which comprises a rinsing spike, a rinsing line connected to the rinsing spike, and a control device, wherein the rinsing spike is movable by means of the control device in such a manner that said rinsing spike, after draining of the container, automatically pierces a wall of the container and rinses out the container,
wherein the receiving unit comprises a rotation device by means of which the container, after insertion into the receiving unit, is rotatable by a predetermined angle and wherein the container is rotatable by means of the rotation device about an axis which is not oriented parallel to a vertical axis.

13. The apparatus of claim 12, wherein the container is rotatable by means of the rotation device about a horizontal axis.

14. The apparatus of claim 12, wherein the rinsing unit comprises a lifting apparatus which is coupled to the rinsing spike and to the control device such that, upon a signal of the control device, the rinsing spike is movable by means of the lifting apparatus in such a manner that said rinsing spike pierces the wall of the container.

15. The apparatus of claim 12, wherein the apparatus has a first detecting device for detecting the quantity of the fluid located in the container, and a second detecting device for detecting the quantity of the fluid removed from the container.

16. The apparatus of claim 15, wherein the first detecting device comprises an electronic receiving device by means of which radio signals emitted by the received container are receivable.

17. The apparatus of claim 15, wherein the control device is coupled by data systems technology to the first and second detecting device and to the rinsing unit, wherein an emptying of the container is automatically detectable by means of the control device and the subsequent rinsing of the container is initiatable.

* * * * *